April 28, 1931. J. J. MADDEN ET AL 1,802,979
OUTLET BOX AND CABLE CLAMPING MEANS THEREFOR
Filed Feb. 13, 1929
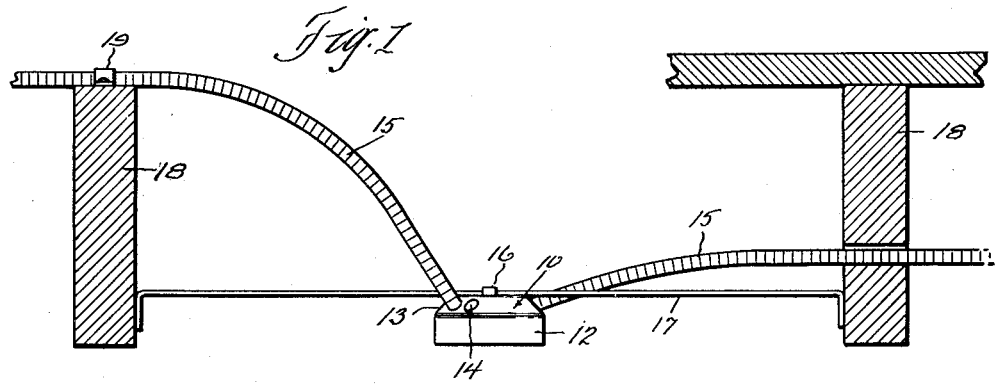
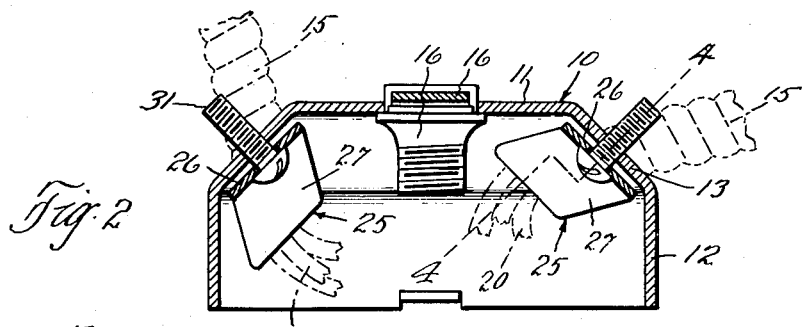
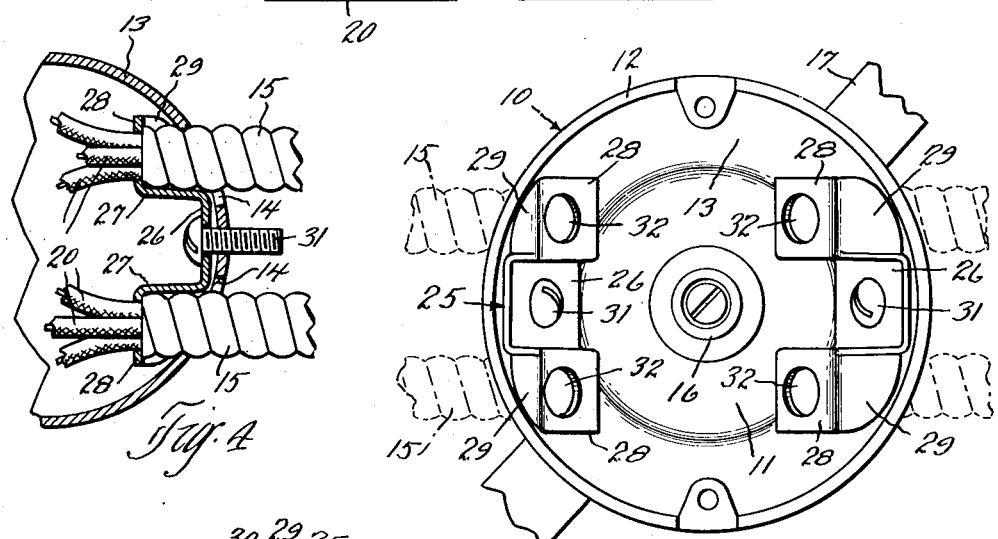
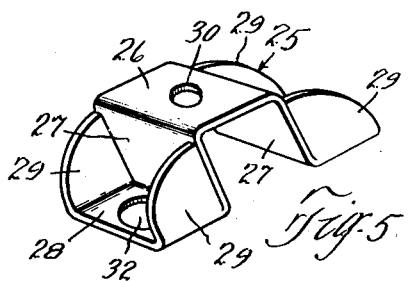
INVENTOR
James J. Madden
Joseph Morgenstern
BY Hull, Brock & West
ATTORNEY Patented Apr. 28, 1931

1,802,979

UNITED STATES PATENT OFFICE

JAMES J. MADDEN, OF LAKEWOOD, AND JOSEPH MORGENSTERN, OF CLEVELAND, OHIO; SAID MADDEN ASSIGNOR TO SAID MORGENSTERN

OUTLET BOX AND CABLE-CLAMPING MEANS THEREFOR

Application filed February 13, 1929. Serial No. 339,559.

This invention relates to new and useful improvements in outlet boxes for electrical fixtures and particularly to outlet boxes to be used with flexible metallic cable in the installation of which it is frequently necessary to pass the cable into the box from a direction substantially perpendicular to the bottom and in other cases from a direction substantially perpendicular to the side wall of the box.

It is the object of our invention to construct a box with knock-out disks therein in such a position that when punched out the cable may be pased therethrough from either a substantially vertical or substantially horizontal position into the box.

A further object is to provide a cable clamping member which cooperates with the wall of the outlet box to hold the cable in place, and which may be turned to receive the end of the cable when it is inserted from either the horizontal or vertical direction, and in either direction the fastening screw is readily accessible from the open side of the outlet box.

With these and such other objects in view as will become apparent from the description the invention resides in the novel features of construction and combination of parts herein disclosed and particularly pointed out in the appended claims.

In the accompanying drawings Fig. 1 is a side elevation of our improved outlet box illustrating how it is secured to the joists and how it is often necessary to pass the flexible cable or wires into it; Fig. 2 is a vertical section through the box illustrated in Fig. 1; Fig. 3 is a bottom plan view of the same; Fig. 4 a detailed sectional view on the line 4—4 of Fig. 2; and Fig. 5 is a perspective view of the clamping member.

In describing our invention, reference is made to the accompanying drawings in which like reference numerals are used to designate like parts in the several views.

The outlet box of our invention designated generally in the drawings by the reference numeral 10 comprises a drawn sheet metal hollow cup shaped member having a flat circular bottom portion 11, a cylindrical outer portion 12 and a frusto conical intermediate portion 13 connecting the bottom 11 and outer cylindrical portion.

The usual construction for outlet boxes of this type is to have a cup member in which the cylindrical side walls extend directly out from a flat bottom whereby the cable or wires must be passed through the flat bottom or through the side wall at right angles to the bottom, in which case two separate sets of knockout openings are necessary, and when the cable is inserted through the side wall it is difficult to clamp the cable in place.

With an outlet box constructed in accordance with our invention the knock-out openings 14 are provided in the frusto conical portion 13 and the armored cables 15 passed through these openings from either the horizontal or vertical as illustrated in Fig. 1 of the drawings. The outlet box 10 is provided with a central opening for the reception of the usual form of securing member 16 by which it is secured to the bracket 17 fastened between the joists 18. As illustrated at the left side of Fig. 1, where it is possible the cable 15 is passed over the top of the joist and secured thereby by the cleat 19. In other cases the cable is passed through the joist as illustrated at the right side in Fig. 1. When secured in either manner the cable is inclined from both the vertical or horizontal and is readily directed through the openings 14 in the conical wall of the box.

For securing the ends of the cable 15 in the box 10 and to provide a smooth surface against which the wires 20 may be pulled a clamping member 25 is provided which is constructed to receive the ends of the cable when directed through the box from either a vertical or horizontal direction and hold them securely in that position.

The clamping member 25 shown in perspective in Fig. 5 is in the form of a stamping having a central U-shaped portion comprising a central web 26 and legs 27, the outer ends 28 of which are bent outward in a plane parallel with the web 26 and provided with apertures 32. Lateral extensions 29 of the portions 28 are bent into the plane of the edges of the legs 27 of the U-portion to form sockets. The web 26 is provided with an opening 30 for the reception of a screw 31 which screws into the box 10 to hold the clamping member in place. The legs 27 of the U-shaped portion are cut so that their side edges while parallel with each other are at an angle to the web portion 26 so that when the clamping member 25 is clamped to the conical portion 13 of the box in one direction the sockets are disposed in the general direction of the bottom of the outlet box to receive the end of the cables 15 when they project into the box substantially perpendicular to the bottom 11, while if the clamping member is rotated on the screw 31 180° the sockets open in the general direction of the side wall of the box to receive the ends of the cables 15 when projected into the box from that direction (see Fig. 2).

The web 26 of the clamping member 25 is a trifle wider than the space between each pair of openings 14 in the conical wall of the box 10 (see Fig. 4) so that when the armored cables 15 are inserted and the ends received in the socket portions of the clamping member as the screw is tightened and the clamping member drawn toward the inner wall of the box the cables 15 are forced into tight engagement with the outer edge of the openings 14 and securely retained in place. The apertures 32 in the portions 28 of the clamping member through which the wires 20 are threaded provides a smooth surface against which the wires may be pulled without danger of cutting the insulation, and the portions 28 serve as abutments for the ends of the armored cable.

The outlet box 10 as illustrated and described with the conical portion 13 between the flat bottom 11 and the perpendicular side wall 12 is readily drawn from sheet metal, and can be made and delivered to the trade at a very reasonable price.

It is of course obvious that the side wall 12 may be hexagonal, octagonal, etc. and the conical portion 13 correspondingly shaped so long as the tapered surface between the side and bottom walls is maintained about the circumference of the box.

With the screw 31 passing through the conical portion 13 of the outlet box it is always readible accessible to the one installing the box irrespective of which direction the cable 15 may enter the box and the clamping member 25 can be readily tightened on the cable ends.

Having thus described our invention, what we claim is:

1. An outlet box comprising a substantially circular bottom wall, a substantially cylindrical side wall and a substantially conical intermediate portion connecting the bottom and side walls, said conical portion being provided with knock-out disks which when removed leave apertures for the reception of armored electric cable, which may extend therein from a direction generally perpendicular to either the bottom or side walls, and means in said box for rigidily securing the end of a cable extending therein from either of said directions.

2. In combination with an outlet box having a tapering wall portion intermediate the bottom and top walls thereof provided with the openings for the reception of a flexible metallic conduit, a clamping member including a web portion, substantially parallel socket portions one at each end of said web portion, said socket portions being disposed at a substantially 45° angle to the plane of said web whereby said clamping member may be clamped in either of two positions on the tapered portion in said box to receive the ends of a conduit inserted from either of two directions.

3. In combination with an outlet box having a tapered wall portion connecting the bottom and side wall thereof, said tapered portion having spaced apertures therethrough for receiving an electric conduit adapted to project therein from either of two directions, a clamping member for securing said conduits in said apertures including a web portion slightly longer than the space between said apertures, screw means passing through said web portion and into said box securing said clamping member in place, said member having wedging members extending outwardly from the ends of said web portion to engage said conduits and as said member is drawn toward the wall of the box to securely clamp said conduits against the outer walls of the apertures into which they extend.

4. An outlet box comprising a cup shaped member having a flat bottom wall, side walls perpendicular thereto and tapered wall portions of substantial width intermediate the bottom and perpendicular side walls, said tapered wall being provided with spaced knock-out disks which when removed leave spaced openings for the reception of the conductor cable, and a clamp secured intermediate said openings for engaging and rigidly clamping the cable in said openings, said clamp member comprising a web portion and outwardly extending socket portions adapted to receive the ends of the cable, the bottom of said socket portions having apertures through which the conductors from said cable may pass, the intermediate web portion being slightly longer than the space between said apertures in said box whereby when it is drawn toward the inner wall of the box the cable will be tightly clamped against the outer edge of said apertures.

5. A clamping member for securing armored conduits in spaced openings in an outlet box comprising an intermediate portion having laterally directed sides constituting wedging surfaces for engaging between the conduits when inserted in the spaced apertures in said box, a flange extending outwardly from each side constituting abutments for the ends of the conduits, said flanges provided with apertures through which the conductors may extend, means on each flange for engaging the sides of the conduit, said intermediate portion having an aperture for the reception of means whereby the clamping member may be secured in the outlet box.

6. A clamping member for securing electric conduits in spaced openings in an outlet box comprising an intermediate portion provided with an opening for the reception of a clamping screw, a socket portion at each end of said intermediate portion for receiving the ends of said conduits, said socket portions extending at substantially 45° angle from the plane of said intermediate portion for the purpose set forth.

7. An outlet box including a bottom wall, a substantially cylindrical side wall and a substantially conical intermediate wall extending completely around the box and connecting the bottom and side walls, said conical wall being provided with openings for electrical conduits which may extend therein from a direction substantially perpendicular to either the bottom or side walls, and a clamping member secured intermediate said openings for rigidly clamping a cable in said openings.

8. In combination, an outlet box having a tapered wall portion connecting the bottom and side walls thereof provided with conduit receiving openings, and a clamping member for securing the conduits therein, said clamping member being secured to said tapered portion of the box and adapted to be turned in either of two directions to receive the ends of the conduits when inserted from a direction perpendicular to either the bottom or side wall of said box.

In testimony whereof, we hereunto affix our signatures.

JAMES J. MADDEN.
JOSEPH MORGENSTERN.